June 19, 1945.   C. L. HUSSEY   2,378,634
CHAINLESS DRIVE FOR BICYCLES
Filed June 20, 1944   4 Sheets-Sheet 2

INVENTOR
CHESTER L. HUSSEY
BY Chapin & Neal
ATTORNEYS

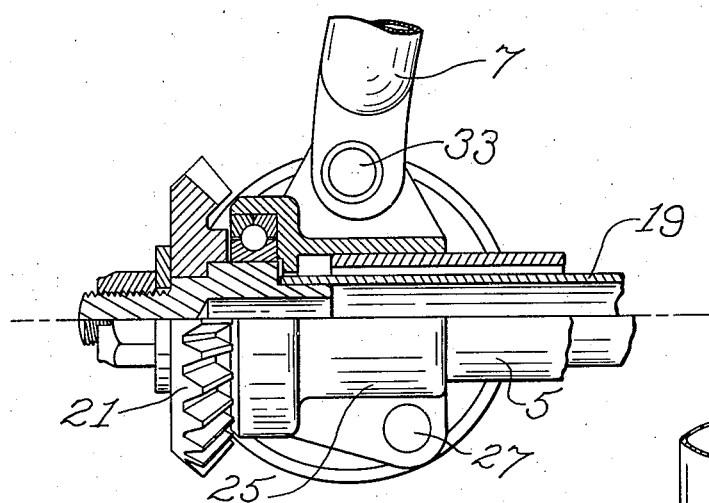
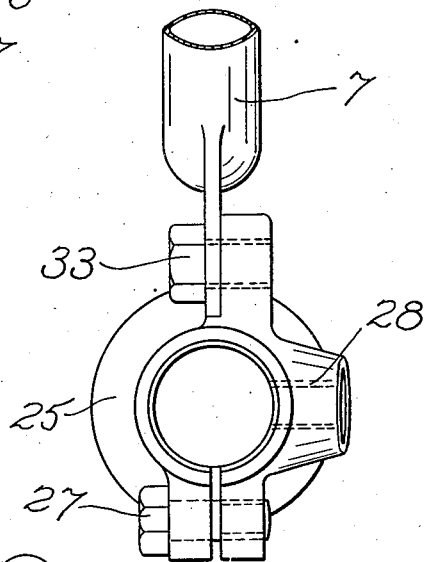
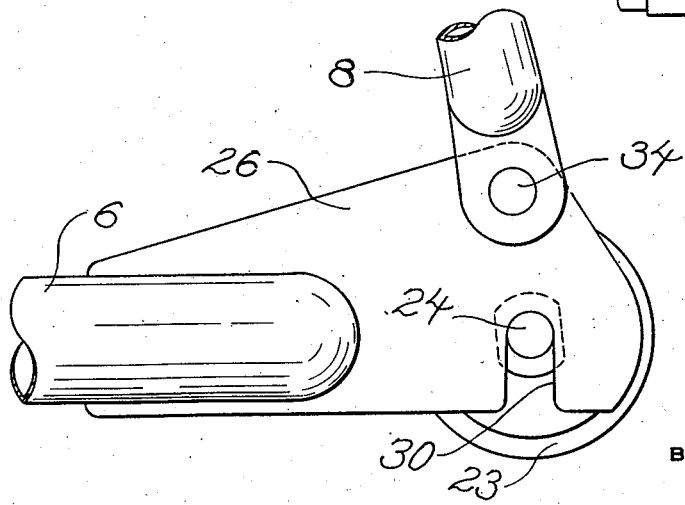

June 19, 1945.  C. L. HUSSEY  2,378,634
CHAINLESS DRIVE FOR BICYCLES
Filed June 20, 1944  4 Sheets-Sheet 4

INVENTOR
CHESTER L. HUSSEY
BY Chapin E Neal
ATTORNEYS

Patented June 19, 1945

2,378,634

UNITED STATES PATENT OFFICE 2,378,634

CHAINLESS DRIVE FOR BICYCLES

Chester L. Hussey, Belchertown, Mass., assignor to Savage Arms Corporation, Utica, N. Y., a corporation of Delaware Application June 20, 1944, Serial No. 541,134

1 Claim. (Cl. 280—260)

This invention relates to an improved drive for chainless bicycles and has for its object a simplified construction and organization of parts for producing such drive mechanism at relatively low cost and having many advantages as hereinafter pointed out.

An object of the invention is to provide in association with such a drive, a gear change mechanism of simple and effective construction for obtaining different speed ratios of drive and whereby the gear drive may be shifted at will during the riding of the bicycle.

A particular feature of improvement resides in a special form of crank hanger or crankcase for housing the front part of the drive, which crankcase in addition to providing for the interior mounting of the gears and gear change mechanism is combined with the frame in such manner as to preserve a relatively narrow tread for the bicycle, viz., a relatively short transverse distance between the crank pedals of the drive.

Further objects and advantages will become apparent from the following detailed description taken in connection with the accompanying drawings which show a preferred embodiment of the invention and in which:

Fig. 3 is a detail side view of the right rear bracket of the rear fork;

Fig. 4 is a detail front view of the same;

Fig. 5 is a detail side view of the left bracket of the rear fork; and

Figure 1:
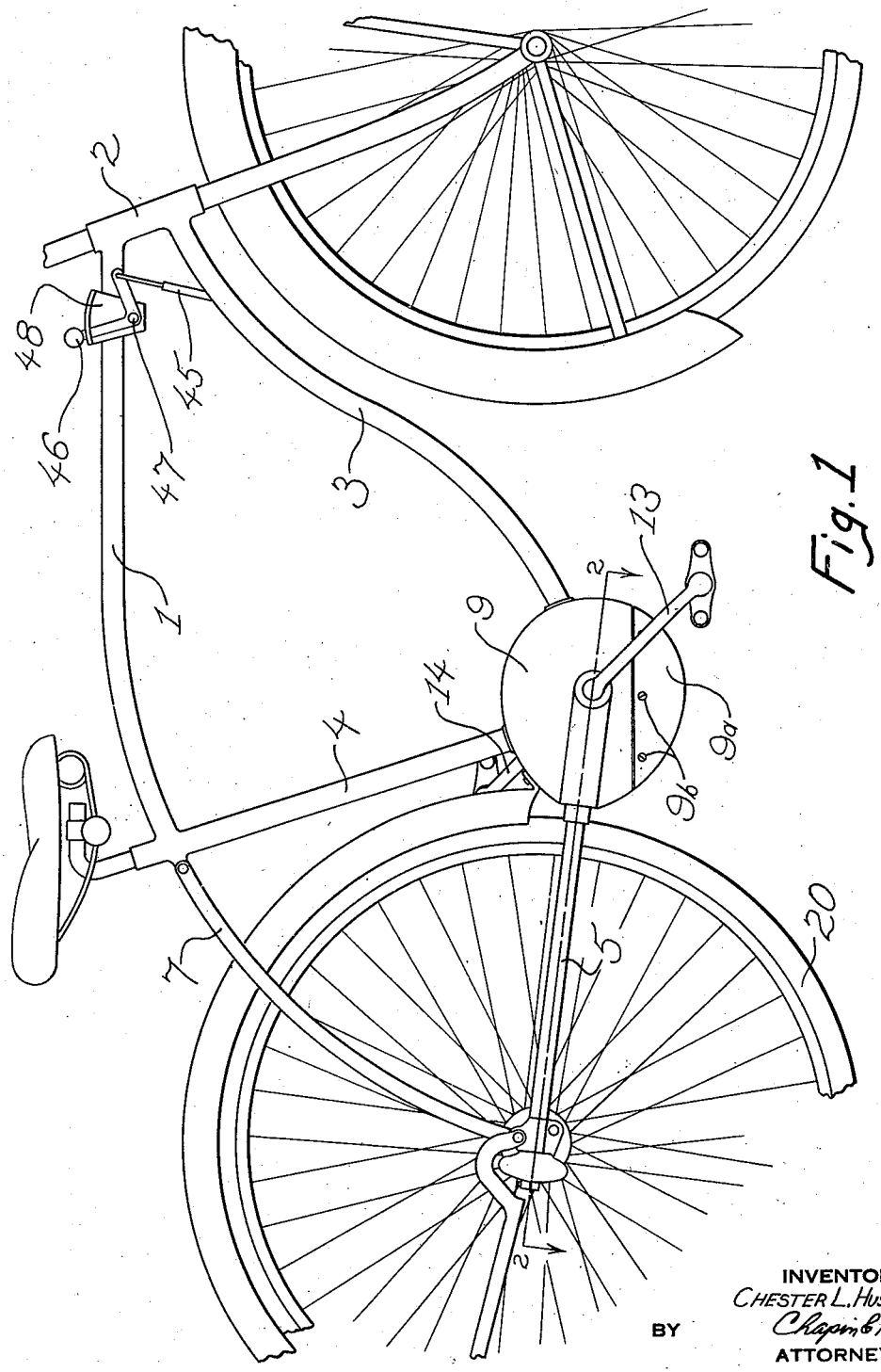
Fig. 1 is a side elevation of so much of the bicycle as is necessary for an understanding of the present invention.
Figure 2:
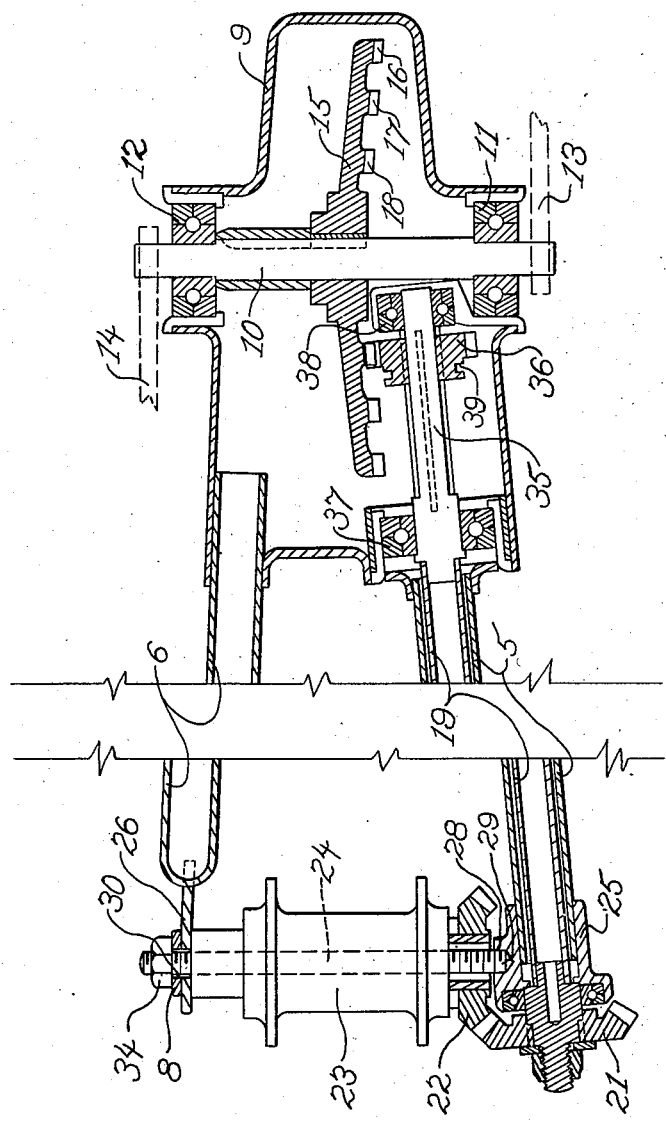
Fig. 2 is a horizontal section through the drive along line 2—2 of Fig. 1.

Referring more particularly to Fig. 1 of the drawings the frame of the bicycle comprises the usual top horizontal bar 1, head 2, front diagonal bar 3, main stanchion bar 4, lower rear fork bars 5 and 6, and upper rear fork bars 7 and 8. At the lower central portion of the frame and forming an integrated part thereof, is an enlarged crank hanger 9 serving as a crankcase housing and which completely incloses the front part of the drive. This crankcase 9 is of substantially symmetrical form with respect to the longitudinal center line of the bicycle. The diagonal bar 3 and the stanchion bar 4 are joined to the peripheral rim of the crankcase at its center line and the lower rear fork bars 5 and 6 are joined to the crankcase, one at each side thereof as shown in Fig. 2. The crankcase 9 is formed of two integral parts, the upper or main body forming part of the main frame as described and a lower or segmental part 9a joined to the upper body along a horizontal seam by screws 9b and inside flange (not shown). This lower part 9a of the housing with its integral sides and bottom rim serves as an oil pan or sump and is removable for giving access to the interior of the crankcase in the assembly of the front drive mechanism therein.

Referring to Fig. 2 of the drawings, the crankshaft 10 is mounted within crankcase 9 by suitable ball bearings 11 and 12, the pedal cranks being indicated at 13 and 14. Fixed to the crankshaft 10 and inclosed within the crankcase 9 is the front drive gear member 15. As shown this drive member 15 is mounted on the crankshaft centrally of the crankcase and rotates substantially in the same plane as that of the rear wheel of the bicycle, in other words at its center line.

In the present embodiment the driving member is in the form of a face gear dished slightly to the right from its hub to its rim and having on its right face three concentrically disposed rings of gear teeth of different diameters. The largest and outer gear ring is indicated at 16, the intermediate gear ring at 17, and the innermost and smallest gear ring at 18. These several gear rings on the face gear 15 are spaced apart as shown so that a pinion driven therefrom may be shifted from mesh engagement with one ring into meshed engagement with the next ring and in passing from one to the next will not be engaged with either ring.

The drive shaft indicated at 19 extends rearwardly from the crankcase 9 through the tubular bar 5 of the lower rear fork to a rear drive connection with the rear wheel 20 of the bicycle. This rear drive connection comprises a bevelled gear 21 fixed to the rear end of drive shaft 19 and positioned at the rear of a bevel gear 22 for meshing engagement therewith. The bevelled gear 22 is connected with the hub 23 of the rear wheel either directly or through a coaster brake mechanism not shown. It will be understood that the hub 23 is mounted by suitable ball bearings on a rear axle 24. The rear axle 24 for the rear wheel 20 is carried in the brackets 25 and 26 at the right and left rear ends respectively of the rear wheel fork. The right hand bracket 26 is clamp fastened to the rear end of lower fork tube 5 by bolt 27. This bracket 25 is formed on its inner or left side with a threaded socket 28 for receiving therein the threaded right hand end 29 of the rear axle 24. The rear side of bracket 25 houses a ball bearing for the rear end of drive shaft 19 and its bevel gear 21. The left hand end of the axle 24 is mounted in a notch 30 of the left bracket 26, which bracket is permanently fixed to the lower rear fork bar 6. The upper rear fork bars 7 and 8 are detachably connected at their upper end by bolt 31 to the frame union 32 at the upper end of stanchion 4. These bars are also detachably connected at their lower ends, bar 7 by bolt 33 to the right bracket 25 and bar 8 by bolt 34 to the left bracket 26. Thus the upper rear fork bars 7 and 8 are completely detachable from the bicycle and the purpose of this arrangement is to facilitate the assembly of the rear wheel into the frame. For example, when the upper rear fork is removed, the rear axle and its assembled wheel may be placed between the lower rear fork and inclined slightly to enter its right threaded end 29 into the socket 28, before slipping the left end of said axle into its notch 30. During his manipulation the bracket 25 may be turned slightly by loosening its clamping bolt 27.

The front end of drive shaft 19 extends into the crankcase 9 and has a splined portion 35 upon which is slidably keyed a pinion 36. Ball bearings 37 and 38 within the crankcase are provided for supporting the front end 35 of said drive shaft 19. The pinion 36 has formed at one side thereof a grooved collar 39 into which engages the fork end 40 of a shifter member whereby said pinion 36 may be slidably adjusted upon the splined end 35 for selective meshing engagement with any one of the gear rings 16, 17, and 18. As heretofore mentioned, the space between the several gear rings is slightly wider than the width of the teeth on said pinion 36 whereby the pinion in shifting from one gear ring to the next will be unmeshed for a smooth non-clashing reengagement in completing the shift.

Figure 6:
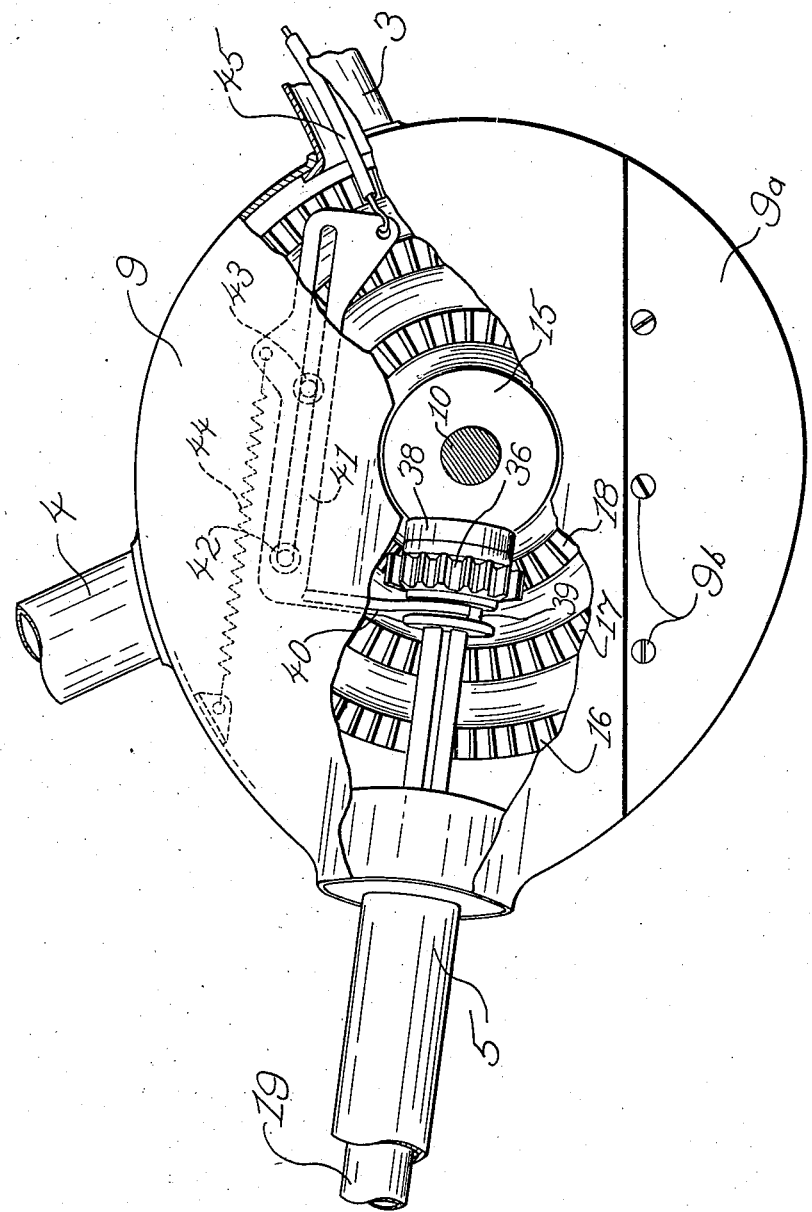
Fig. 6 is a detailed side view of the crank case partly broken away to show some of the inclosed parts.

As shown more particularly in Fig. 6, there is mounted at the upper right hand side of the crankcase for sliding back and forth movement, a shifter member 41 in the form of a flat plate which is guided in its sliding movement on studs 42 and 43. At the rear end of said shifter 41 and bent at right angles thereto is a downwardly projecting fork 40 which is in engagement with the grooved collar 39 of pinion 36 as previously described. A spring 44 anchored to the crankcase and connected to the shifter member 41 tends to pull the same rearwardly at all times for engaging the pinion 36 with the largest gear ring 16. This provides the normal highest gear drive for the bicycle. Connected to the front end of the shifter member 41 is a flexible cable 45 which extends through the front of the crankcase 9 and preferably guided through a portion of the diagonal tube bar 3 to a connection with a manually operated shift lever 46 mounted on the upper frame bar 1 as shown in Fig. 1. The shift lever 46 is pivotal at 47 on a suitably notched quadrant bracket 48 whereby said lever will be releasably locked in any one of three adjusted positions.

In Fig. 1 the lever 46 is shown in its rearmost position which corresponds to the foremost position of the shift member 41 and is for the lowest gear ratio drive. When a high gear drive is desired, lever 46 is released from its notch and the spring 44 will automatically shift the pinion 36 into the next higher gear ratio drive. This gear shift may be accomplished whether or not the bicycle is in motion since the driving end or crankshaft 10 is automatically declutched so to speak from the driven end of shaft 19 during the shift of pinion 36. The use of an ordinary coaster brake with a free wheel clutch will also facilitate the shifting of gears since both the crank shaft 10 and drive shaft 19 may be held stationary at will while the bicycle is in motion.

I claim:

In a chainless drive bicycle in combination, the main frame with its front and rear wheels, said frame comprising as an integrated part thereof at its lower central portion, an enlarged symmetrically positioned crankcase housing, a forward diagonal tube member joined to the rim of said housing at the front thereof, a vertical stanchion member joined to the rim of said housing at the top thereof and a pair of rear wheel fork tube members extending rearwardly from said housing, a crankshaft mounted in said housing, a relatively large face gear fixed to said crankshaft and positioned centrally within said housing for rotation in substantially the same plane as said rear wheel, said face gear comprising a plurality of concentric gear rings, a drive shaft extending longitudinally through one of said rear fork tube members and into said housing, a relatively small pinion splined on the forward end of said drive shaft within said housing and slidably adjustable thereon for meshing engagement with any one of said gear rings, a gear driving connection between the rear end of said drive shaft and said rear wheel, a gear shifter member movably mounted on said housing within the same and having means engaging said pinion for shifting the same in and out of mesh with said different gear rings, a spring mounted within said housing tending to move said shifter member and its engaged pinion in one direction, a flexible cable connected to said shifter member for moving it in the opposite direction, said cable extending from within said housing upwardly through the inside of said forward diagonal tube, and a manually operated member mounted on the upper part of said main frame to which said cable is connected.

CHESTER L. HUSSEY.